United States Patent
Rasset et al.

(10) Patent No.: US 9,597,954 B2
(45) Date of Patent: Mar. 21, 2017

(54) EXHAUST SUPPORT SYSTEM FOR AN OFF-ROAD VEHICLE

(71) Applicant: CNH Industrial America LLC, New Holland, PA (US)

(72) Inventors: John T. Rasset, Barnesville, MN (US); Nathan James Carlson, West Fargo, ND (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 14/606,819

(22) Filed: Jan. 27, 2015

(65) Prior Publication Data

US 2016/0214476 A1    Jul. 28, 2016

(51) Int. Cl.
*B60K 13/04* (2006.01)
*B23K 31/02* (2006.01)
*B23P 15/00* (2006.01)
*F01N 13/18* (2010.01)

(52) U.S. Cl.
CPC .............. *B60K 13/04* (2013.01); *B23K 31/02* (2013.01); *B23P 15/00* (2013.01); *F01N 13/1805* (2013.01); *F01N 13/1872* (2013.01); *B23P 2700/50* (2013.01); *F01N 2590/08* (2013.01); *F01N 2610/1406* (2013.01)

(58) Field of Classification Search
CPC ......... B60K 13/04; B23K 31/02; B23P 15/00; B23P 2700/50
See application file for complete search history.

(56) References Cited

U.S. PATENT DOCUMENTS

| 1,983,355 | A |  | 12/1934 | Escher |
|---|---|---|---|---|
| 2,952,380 | A |  | 9/1960 | Hampton et al. |
| 3,069,037 | A |  | 12/1962 | Dow |
| 3,287,882 | A |  | 11/1966 | Smith |
| 3,404,470 | A | * | 10/1968 | Raiti .................. B65F 3/18 126/343.5 R |
| 3,818,672 | A |  | 6/1974 | Moore, Sr. |

(Continued)

FOREIGN PATENT DOCUMENTS

| CN | 102535713 A | 7/2012 |
|---|---|---|
| CN | 202492933 U | 10/2012 |

(Continued)

OTHER PUBLICATIONS

Upper Bumper Gusset; Transamerican Wholesale L.L.C; http://www.transamericanwholesale.com/Winches-Winch-Accessories/Upper-Bumper-Gusset.aspx?t_c=18&t_s=124&t_pt=5011&t_pl=105227&t_pn=OAI12021.28; Jan. 27, 2015.

(Continued)

*Primary Examiner* — Faye M Fleming
(74) *Attorney, Agent, or Firm* — Rickard K. DeMille; Rebecca L. Henkel

(57) ABSTRACT

An exhaust support system for an off-road vehicle including a fender having a liquid storage tank, a loading plate coupled to a frame of the off-road vehicle, and a gusset coupled to the liquid storage tank and to the loading plate. The gusset is formed from a flat plate and includes a body coupled to the liquid storage tank, a base coupled to the loading plate, and a curved portion coupling the base to the body. Additionally, the curved portion is configured to redistribute a force from the liquid storage tank to the loading plate.

18 Claims, 5 Drawing Sheets

(56) References Cited

U.S. PATENT DOCUMENTS

| | | | |
|---|---|---|---|
| 3,907,057 A * | 9/1975 | Reddekopp | B60K 13/04 |
| | | | 180/89.2 |
| 4,283,090 A | 8/1981 | Fikse | |
| 4,448,387 A | 5/1984 | Gilbreath | |
| 4,962,825 A * | 10/1990 | Albright | B60K 11/00 |
| | | | 180/292 |
| 5,950,975 A | 9/1999 | Zieske | |
| 8,365,476 B2 | 2/2013 | Richard et al. | |
| 8,814,236 B2 | 8/2014 | Kors et al. | |
| 2003/0052482 A1 * | 3/2003 | Yamaguchi | B62J 35/00 |
| | | | 280/833 |
| 2008/0238148 A1 * | 10/2008 | Nakamura | B62D 25/20 |
| | | | 296/203.01 |
| 2014/0196973 A1 | 7/2014 | Sellars | |

FOREIGN PATENT DOCUMENTS

| | | |
|---|---|---|
| CN | 203925693 | 11/2014 |
| DE | 202005007226 | 7/2005 |
| DE | 102004023585 | 12/2005 |
| DE | 102010025613 | 1/2011 |
| DE | 102010010397 | 9/2011 |
| WO | 2011/003395 | 1/2011 |

OTHER PUBLICATIONS

4 Hole Gusset L-shape Bracket; Tamlex; http://tamlex.co.uk/index.php/4-hole-gusset-l-shape-bracket.html; Jan. 27, 2015.
European Search Report issued Jun. 7, 2016 for European Application No. 16152802.1 (7 pages).

* cited by examiner

EXHAUST SUPPORT SYSTEM FOR AN OFF-ROAD VEHICLE

BACKGROUND

The invention relates generally to off-road vehicles and, more particularly, to an exhaust support system for an off-road vehicle.

Exhaust systems are used to guide exhaust gases away from a controlled combustion device, such as an engine. Exhaust systems may include components such as a cylinder head, an exhaust manifold, a turbocharger, a treatment system, and a muffler (e.g., silencer). In an exhaust system for an internal combustion engine, exhaust gases of each cylinder of the engine exit through the cylinder head. Thereafter, the exhaust manifold collects the exhaust gases from the cylinders into one or more conduits or pipes. In some exhaust systems, the flow of the exhaust gases may be directed from the conduits through the turbocharger. Accordingly, the exhaust gases may be used to drive a turbine of the turbocharger to induce rotation of an impeller, which compresses air used by the engine. The exhaust gases may be treated in the treatment system to reduce certain components (e.g., NOx, particulates, etc.) in the exhaust gases. Then, the exhaust gases flow through a muffler that directs the exhaust gases out of the exhaust system and reduces noise of the exhaust. Certain off-road vehicles, such as tractors, may include a muffler that mounts on a fender of the off-road vehicle.

BRIEF DESCRIPTION

In an embodiment, an exhaust support system for an off-road vehicle includes a fender having a liquid storage tank, a loading plate coupled to a frame of the off-road vehicle, and a gusset coupled to the liquid storage tank and to the loading plate. In certain embodiments, the gusset is formed from a flat plate and includes a body coupled to the liquid storage tank, a base coupled to the loading plate, and a curved portion coupling the base to the body. Additionally, the curved portion is configured to redistribute a force from the liquid storage tank to the loading plate.

In a further embodiment, a system includes a gusset formed from a flat plate. The gusset includes a body having concave edges that converge to form a neck having a first width. The gusset also includes a stress reducer extending from the neck. A second width of the stress reducer is greater than the first width of the neck. Additionally, the gusset includes a base oriented at an angle relative to the body. The gusset also includes a transition extending between the body and the base.

In an embodiment, a method of forming a support system includes forming a flat plate via a first manufacturing process. The flat plate includes a base, a body, and a transition extending between the base and the body. The method also includes shaping the flat plate via a second manufacturing process to form a gusset. Also, shaping the flat plate includes orienting the base at an angle relative to the body and forming a curved portion at the transition. The method further includes mounting the body of the gusset to a tank of an off-road vehicle, and mounting the base of the gusset to a frame of the off-road vehicle.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Embodiments of the present disclosure are directed toward a system for supporting components of an exhaust system of an off-road vehicle. In certain embodiments, components of the exhaust system (e.g., a diesel oxidation catalyst unit, a muffler, etc.) may be mounted to a fender of the off-road vehicle. The components may transfer load to the fender (e.g., due to the weight of the components, due to forces resulting from vertical accelerations associated with rough terrain, etc.). Accordingly, a gusset may be coupled to the fender to transfer forces from the fender to a frame of the off-road vehicle. Moreover, the gusset may be configured to distribute the forces over a larger surface area, thereby reducing stress concentrations while enabling energy to be dissipated by flexing of the components.

Figure 1:
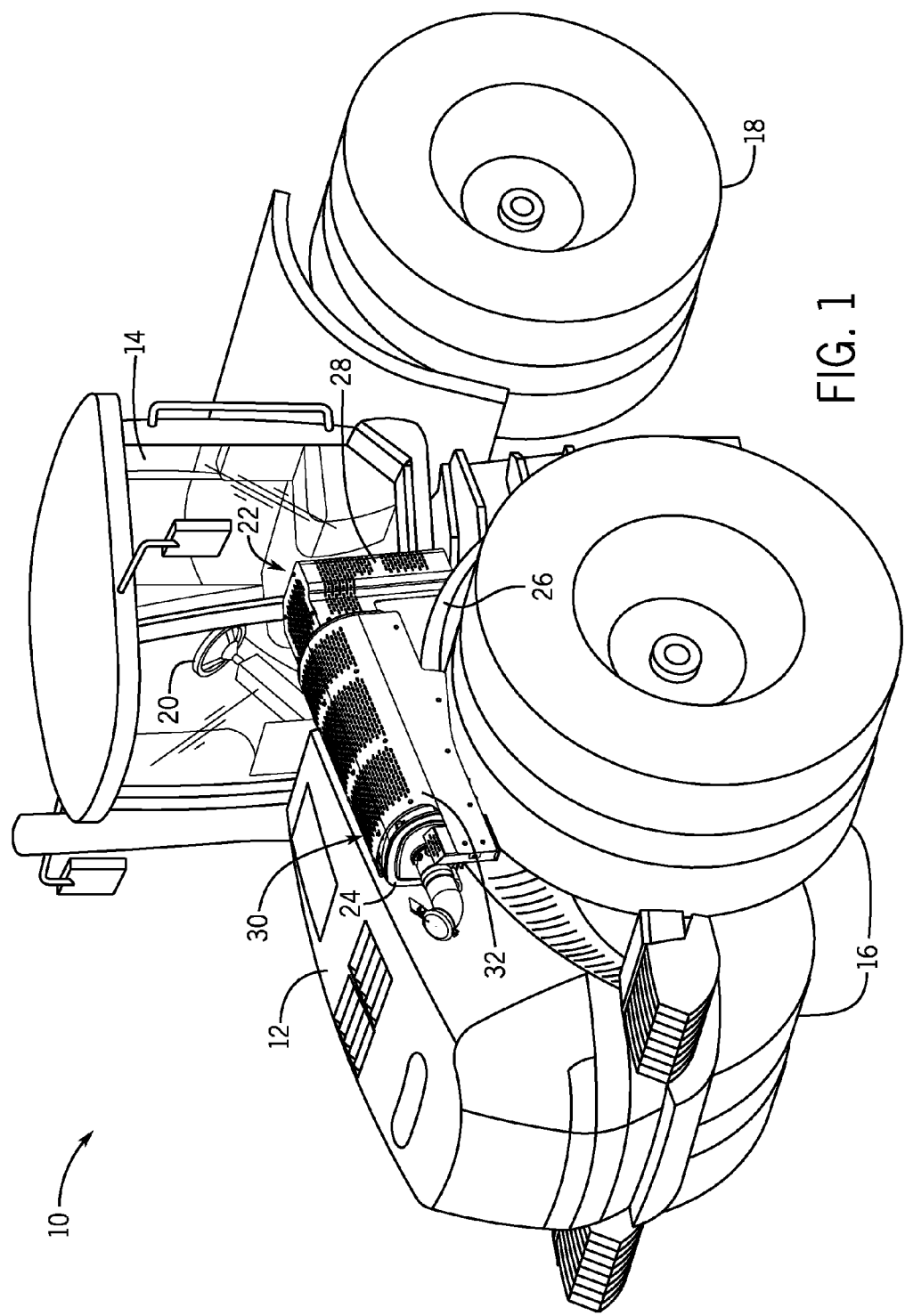
FIG. 1 is a perspective view of an embodiment of an agricultural vehicle having an exhaust system.

FIG. 1 is a perspective view of an embodiment of an off-road vehicle 10 (e.g., an agricultural vehicle) with a substantially horizontal muffler. In certain embodiments, the off-road vehicle 10 may be any type of tractor, off-road vehicle, work vehicle, or any other suitable vehicle that utilizes an exhaust system. The off-road vehicle 10 has a body 12 that typically houses an engine, transmission, and power train. Furthermore, the off-road vehicle 10 has a cabin 14 where an operator may sit or stand to operate the off-road vehicle 10. The off-road vehicle 10 has two front wheels 16 and two rear wheels 18 that rotate to move the off-road vehicle 10. However, other embodiments may include any number of wheels or tracks to move the off-road vehicle 10. As illustrated, the off-road vehicle 10 is maneuvered using a steering wheel 20 configured to articulate the off-road vehicle 10 about an axis. In certain embodiments, the steering wheel 20 may turn the front wheels 16 (or the rear wheels 18) to control the steering of the off-road vehicle 10.

The off-road vehicle 10 includes an exhaust system 22. As illustrated, the exhaust system 22 includes a muffler 24 (e.g., silencer) configured to direct exhaust gas out of the engine of the off-road vehicle 10. The muffler 24 is also configured to reduce a noise of the exhaust system 22. For example, the muffler 24 may be configured to reduce the magnitude of sound pressure oscillations created by the engine by damping the oscillations. In certain embodiments, the muffler 24 includes a selective catalytic reduction reactor (SCR) to remove certain emissions from the exhaust stream. As a result, in some embodiments, the muffler 24 may not be cylindrical. For example, the cross-section of the muffler 24 may be substantially D-shaped, elliptical, or the like. As illustrated, the muffler 24 is mounted so that a longitudinal axis of the muffler 24 extends in a substantially horizontal direction (e.g., substantially parallel to the ground). However, in other embodiments, the muffler 24 may be mounted so that the longitudinal axis of the muffler 24 extends in a substantially vertical direction (e.g., substantially perpendicular to the ground). As illustrated, the muffler 24 is mounted proximate to a fender 26 of one front wheel 16. In the illustrated embodiment, a front end of the muffler 24 is angled downward relative to the surface of the ground. Furthermore, the muffler 24 is mounted forward of the cabin 14 (e.g., relative to a primary direction of travel), forward of the steering wheel 20, and adjacent to the body 12 of the off-road vehicle 10. Such a position and orientation of the muffler 24 may place the muffler 24 out of a line of sight of an operator within the cabin 14, thereby enhancing operator visibility.

In the illustrated embodiment, the exhaust system 22 also includes a diesel oxidation catalyst (DOC) 28. The DOC 28 is an exhaust after treatment system configured to oxidize hydrocarbons and carbon monoxide in the exhaust stream. In certain embodiments, diesel exhaust fluid may be injected downstream of the DOC 28 to facilitate further reactions in the SCR 24. The DOC 28 may be coupled directly to the muffler 24 or to a muffler mounting assembly 30. The muffler mounting assembly 30 is configured to receive and to support the muffler 24.

As shown in FIG. 1, the muffler mounting assembly 30 incorporates a cover 32 over the muffler 24 and the DOC 28. The cover 32 provides a barrier between the surfaces of the muffler 24 and the DOC 28 and the environment. In some embodiments, the cover 32 substantially wraps around the circumference of the muffler 24. However, in other embodiments, the cover 32 may partially cover the muffler 24. Furthermore, the cover 32 may fully or partially enclose the DOC 28. The cover 32 may be coupled to the muffler mounting assembly 30 and/or to the fender 26.

Figure 2:
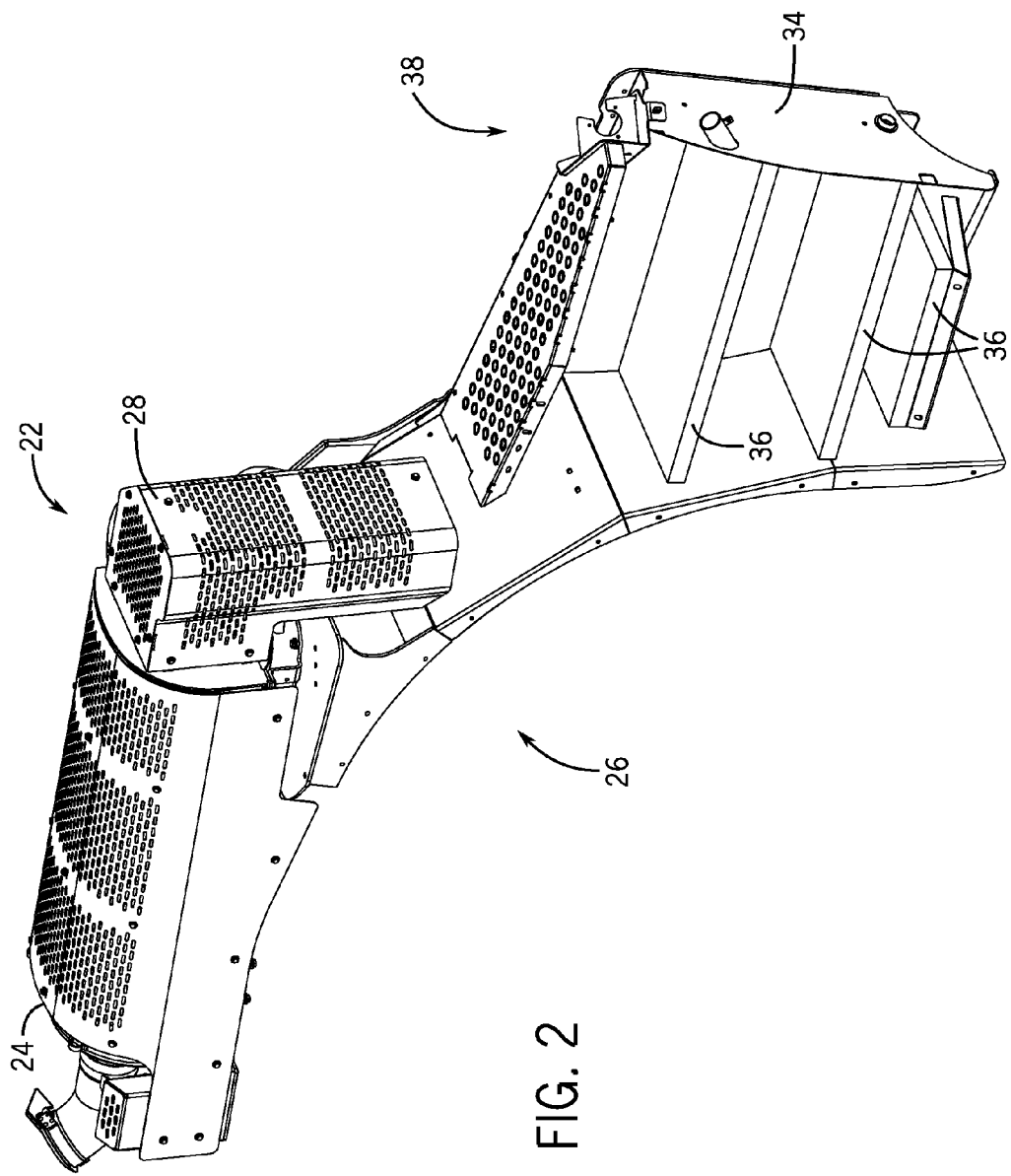
FIG. 2 is a perspective view of an embodiment of a fender that may be employed on the agricultural vehicle of FIG. 1.

FIG. 2 is a perspective view of the fender 26. In the illustrated embodiment, the fender 26 includes a tank 34 and steps 36. That is, the tank 34 and the steps 36 are integrally formed into the fender 26. In certain embodiments, the tank 34 may hold fuel, diesel exhaust fluid, hydraulic fluid, or the like. Accordingly, the fender 26 is rigidly coupled to a frame of the agricultural vehicle 10, thereby coupling the tank 34 to the frame. For example, in certain embodiments, the tank 34 is formed from sheet metal and welded to form a pressure-containing vessel. However, in other embodiments, the tank 34 may include metal elements that are bolted or otherwise sealed to one another to contain the fluid within the tank 34. Additionally, as shown in FIG. 2, the steps 36 are mounted directly to the tank 34. As a result, the tank 34 and steps 36 formed with the fender 26 may improve the visual appearance of the agricultural implement 10. Moreover, the integrated tank 34 and steps 36 may facilitate assembly and/or production of the agricultural vehicle 10.

As described above, in certain embodiments, the exhaust system 22 (e.g., the muffler 24, the DOC 28, etc.) are mounted to the fender 26. The exhaust system 22 applies a force 38 to the fender 26 (e.g., due to the weight of the components, due to forces resulting from vertical accelerations associated with rough terrain, etc.). The force 38 may be in a generally downward direction (e.g., transverse to the plane of the ground). Moreover, the force may be periodically increased due to the vertical accelerations associated with rough terrain. As a result, the force 38 generates substantially vertical (e.g., transverse to the plane of the ground) loading on the tank 34, which induces stress at a coupling point between the tank 34 and the frame of the agricultural vehicle 10. Accordingly, additional support structures may be incorporated to transfer the force 38 to the frame of the agricultural vehicle 10. For example, a gusset may be mounted to the tank 34 and the frame of the agricultural vehicle 10. The gusset may be configured to direct the force 38 toward the frame of the agricultural vehicle 10 and to distribute the force 38 over a larger surface to reduce the likelihood of stress concentrations on the tank 34. While embodiments may be directed toward mounting the gusset on the tank 34 and the frame of the agricultural vehicle 10, in other embodiments the gusset may be utilized in any suitable location to provide additional support.

Figure 3:
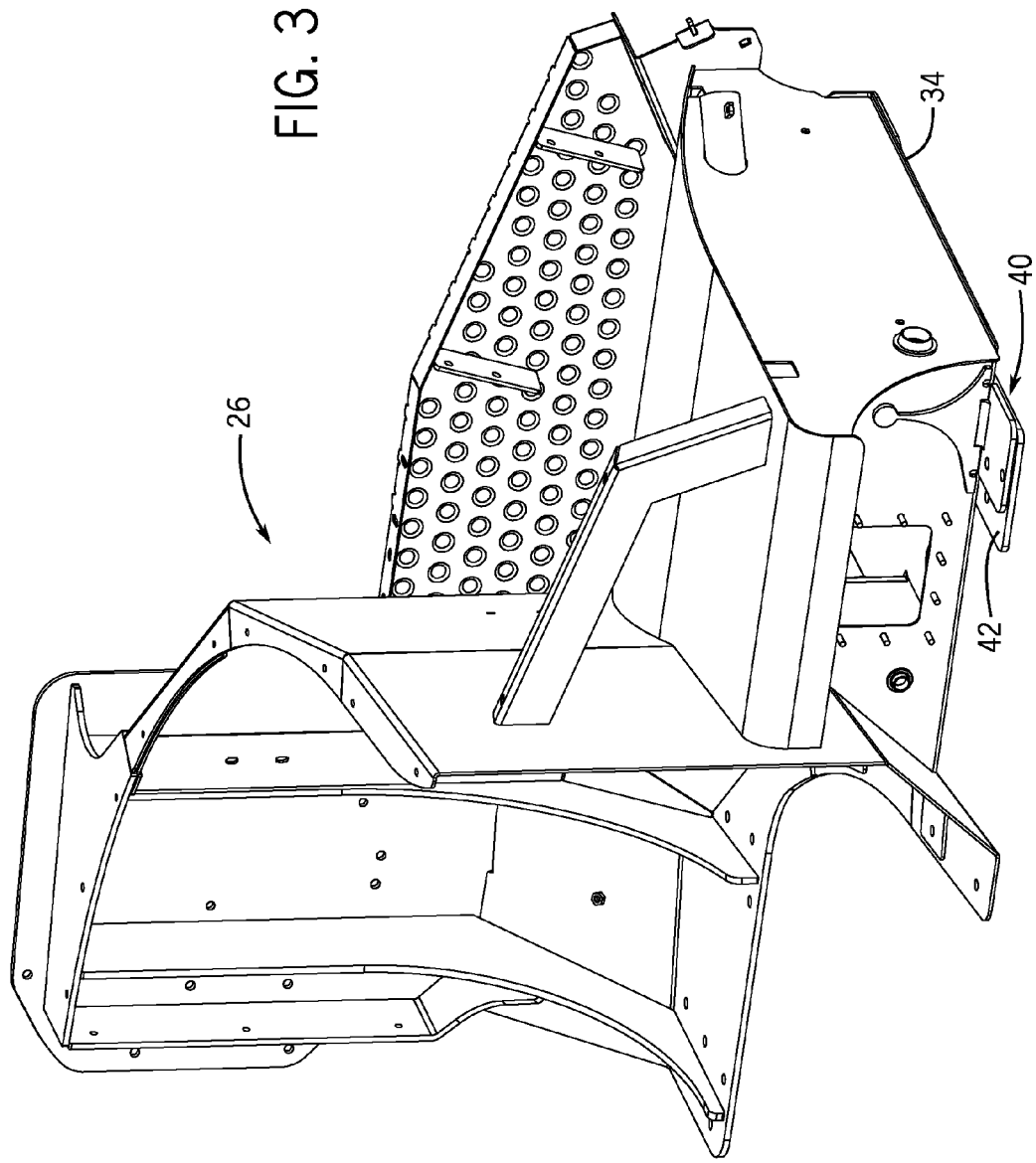
FIG. 3 is a bottom perspective view of the fender of FIG. 2 having an embodiment of a gusset.

FIG. 3 is a perspective view of the fender 26 having an embodiment of a gusset 40 coupled to the tank 34 and a loading plate 42 of the frame of the agricultural vehicle 10. The gusset 40 is configured to transfer the force 38 on the fender 26 to the agricultural vehicle frame, thereby reducing the stress on the tank 34. In other words, the gusset 40 distributes the load from the force 38 to the frame of the agricultural vehicle 10. However, as mentioned above, the gusset 40 may be utilized to distribute load to other components. Moreover, the gusset 40 is configured to enable dissipation of energy by enabling flexing of the components of the exhaust system 22. As will be described in detail below, the gusset 40 includes a contoured portion configured to direct the force 38 toward the frame of the agricultural vehicle 10. Additionally, the gusset 40 includes a stress reducing component configured to distribute stresses (e.g., due to fabrication, due to welding, due to the force 38, etc.) over a larger surface area, thereby distributing the load over a larger area of the tank 34 and substantially reducing or eliminating undesirable stress points on the tank 34. Furthermore, the gusset 40 includes curved (e.g., arcuate) edges to distribute the load from a top section of the gusset toward an area with a larger surface area.

Figure 4:
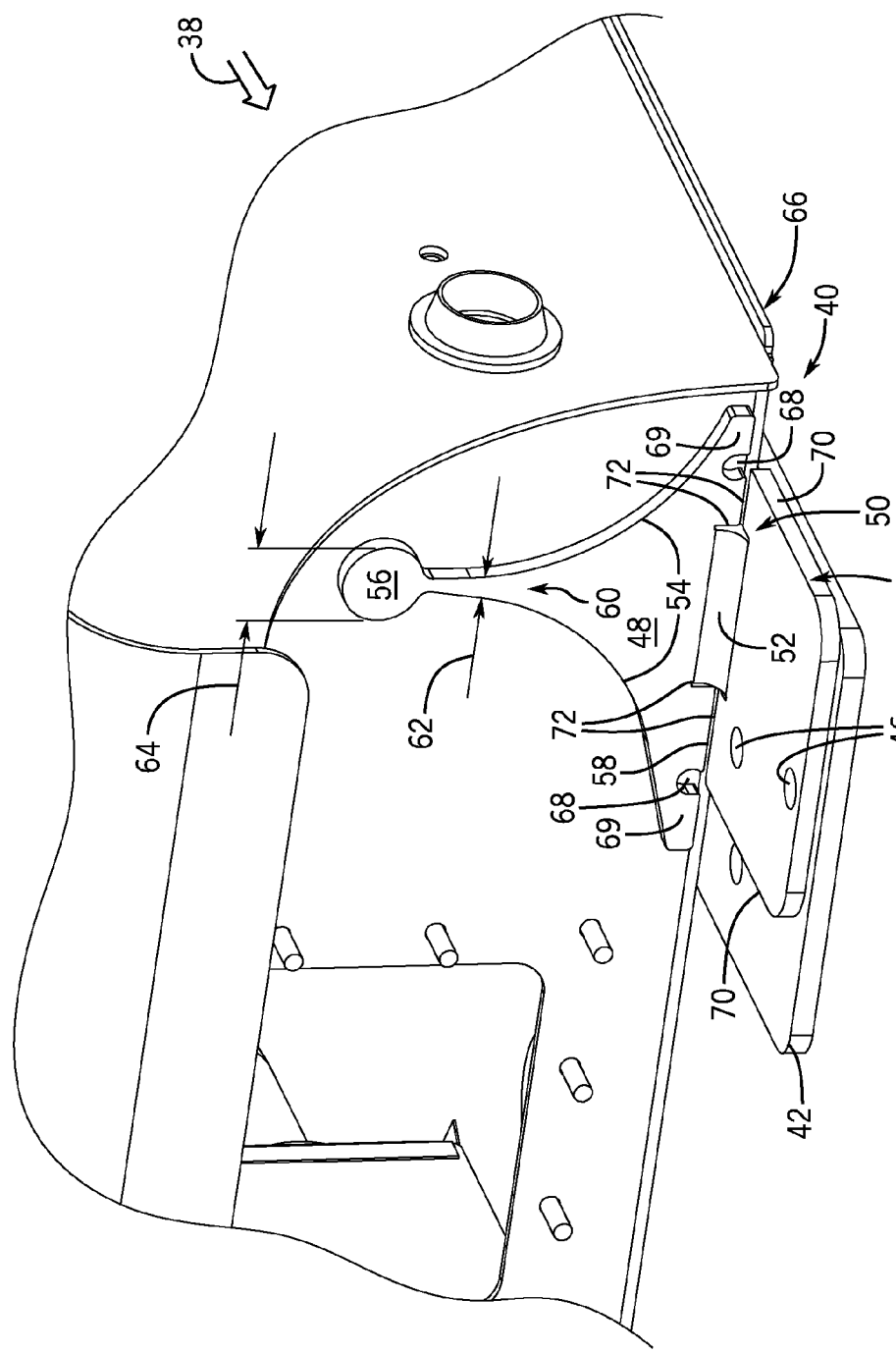
FIG. 4 is a perspective view of the gusset of FIG. 3 disposed between a tank and a loading plate.

FIG. 4 is a perspective view of the gusset 40 coupled between the tank 34 of the fender 26 and the loading plate 42 of the off-road vehicle frame. In the illustrated embodiment, the gusset 40 includes a base 44 having apertures 46. In certain embodiments, the apertures 46 are configured to facilitate coupling of the gusset 40 to the loading plate 42 via fasteners (e.g., bolts, screws, pins, etc.). However, in other embodiments, the gusset 40 may be welded or otherwise coupled to the loading plate 42. Additionally, in certain embodiments, the gusset 40 may be both welded and bolted to the loading plate 42. In the illustrated embodiment, the gusset 40 includes a body 48 and a transition 50 extending between the body 48 and a base 44. In certain embodiments, the components of the gusset 40 are formed from a single piece of material (e.g., a flat piece of metal). As shown, the transition 50 includes a curved portion 52 extending between the base 44 and the body 48. In the illustrated embodiment, the curved portion 52 is concave relative to the base 44. However, in some embodiments, the curved portion may be convex relative to the base 44. Additionally, in other embodiments, the transition may be linear (e.g., angled relative to the base 44). As will be described below, in certain embodiments, the curved portion 52 may be formed during manufacturing of the gusset 40 via a bending or deforming process.

In the illustrated embodiment, the body 48 of the gusset includes edges 54. The edges 54 are generally arcuate and extend from a stress reducer 56 to a bottom 58 (e.g., proximate to the base 44) of the body 48. While the edges 54 are arcuate in the illustrated embodiment, in other embodiments the edges 54 may be linear or any other shape configured to redistribute stresses (e.g., from the force 38) across the tank 34. The edges 54 are configured to converge toward the stress reducer 56. That is, the edges 54 have a generally concave shape. In certain embodiments, the edges 54 may be welded to the tank 34. For example, a weld may extend along a length of the edges 54 (e.g., substantially along a periphery of the body 48). However, in other embodiments, the weld may only extend over a portion of the length of the edges 54. For example, the edges 54 may be spot welded with spaces between each weld. Moreover, in certain embodiments, the edges 54 may be adhered or otherwise attached to the tank 34.

The converging edges 54 form a neck 60 that extends to the stress reducer 56. In the illustrated embodiment, the neck 60 has a smaller width 62 than a width 64 of the stress reducer 56. In certain embodiments, the larger width 64 establishes a larger surface area of the stress reducer 56 than the surface area of the neck 60. Accordingly, the force at the stress reducer 56 is distributed over a larger area than the force at the neck 60. As shown, the stress reducer 56 is positioned laterally farther from a back side 66 of the tank 34 than the neck 60. Accordingly, the stress reducer 56 is configured to receive a larger force than the neck 60 (e.g., due to a moment about the loading plate 42). Therefore, the larger width 64 of the stress reducer 56 enables the stress reducer 56 to effectively distribute the larger force while reducing stress concentrations on the surface of the tank 34. In other words, the larger width 64 of the stress reducer 56 generates a larger surface over which to distribute the force, thereby generating a smaller pressure upon the tank surface and substantially reducing or eliminating stress points on the tank 34.

In the illustrated embodiment, the stress reducer 56 is generally circular. However, in other embodiments, the stress reducer 56 may be arcuate, triangular, elliptical, polygonal, or any other suitable shape. Forming the stress reducer 56 as a body having a larger area than the neck 60 enables the stress reducer 56 to redistribute the stress acting on the tank 34 toward the edges 54 and the bottom 58. Accordingly, the likelihood of stress points forming on the tank 34 between the gusset 40 and the tank 34 may be reduced.

The gusset 40 includes notches 68 along the bottom 58 of the body 48, in the illustrated embodiment. The notches 68 are generally arcuate (e.g., semi-circular) and are configured to distribute the stresses acting on the body 48 toward the transition 50. That is, the notches 68 redirect the stresses along the curved edges of the notches 68. Additionally, in other embodiments, the notches 68 may be polygonal, elliptical, or any other suitable shape. Furthermore, the notches 68 are configured to enable small deflections and deformations of the tank 34. For example, the notches 68 may enable the tips 69 of the body 48 to flex, thereby enabling the tank 34 to deform to dissipate energy. Small deformations may direct the force 38 away from the tank 34 and toward the frame of the agricultural vehicle 10. In the illustrated embodiment, the notches 68 are substantially aligned with the base 44. That is, the sides 70 of the base 44 are aligned with the notches 68. However, in other embodiments, the notches 68 may be positioned inward or outward from the sides 70. In certain embodiments, weld metal is disposed within the notches 68 to facilitate coupling the body 48 to the tank 34. However, as mentioned above, in other embodiments, the notches 68 may facilitate small deformations of the tank 34, and therefore not include weld metal within the notches 68.

In the illustrated embodiment, slits 72 are disposed on both sides of the transition 50. The slits 72 are configured to separate at least a portion of the base 44 from at least a portion of the body 48 and to facilitate manufacture of the gusset 40. As will be described below, the gusset 40 may be formed from a single piece of material (e.g., single sheet of material) and the slits 72 may facilitate bending of the gusset 40. Moreover, the slits 72 enable the base 44 and the body 48 to be coupled by only the transition 50. In certain embodiments, the slits 72 are not filled with weld metal to enable flexing and movement of the tank 34 relative to the loading plate 42. However, in other embodiments, the slits 72 are filled with weld metal or adhesives to couple the gusset 40 to the tank 34 and/or to the loading plate 42. Additionally, in certain embodiments, the slits 72 are configured to control rotational movement of the body 48 relative to the base 44. As a result, the energy dissipation from the body 48 to the base 44 is controlled by the slits 72.

As shown, in the illustrated embodiment, the base 44 is oriented at an approximately 90 degree angle, relative to the body 48. However, in other embodiments, the base 44 may be oriented at approximately 80 degrees, approximately 70 degrees, approximately 60 degrees, or any other suitable angle to enable transferring the force 38 from the tank 34 to the frame of the off-road vehicle 10. As described above, the base 44 may be coupled to the loading plate 42 via fasteners disposed through the aperture 46. However, in certain embodiments, the base 44 may also be welded to the loading plate 42 to form a robust connection between the gusset 40 and the loading plate 42. For example, weld metal may extend about a periphery of the base 44. However, in other embodiments, the weld metal may be selectively placed about the periphery of the base 44. Moreover, in certain embodiments, only weld metal may couple the base 44 to the loading plate 42.

Figure 5:
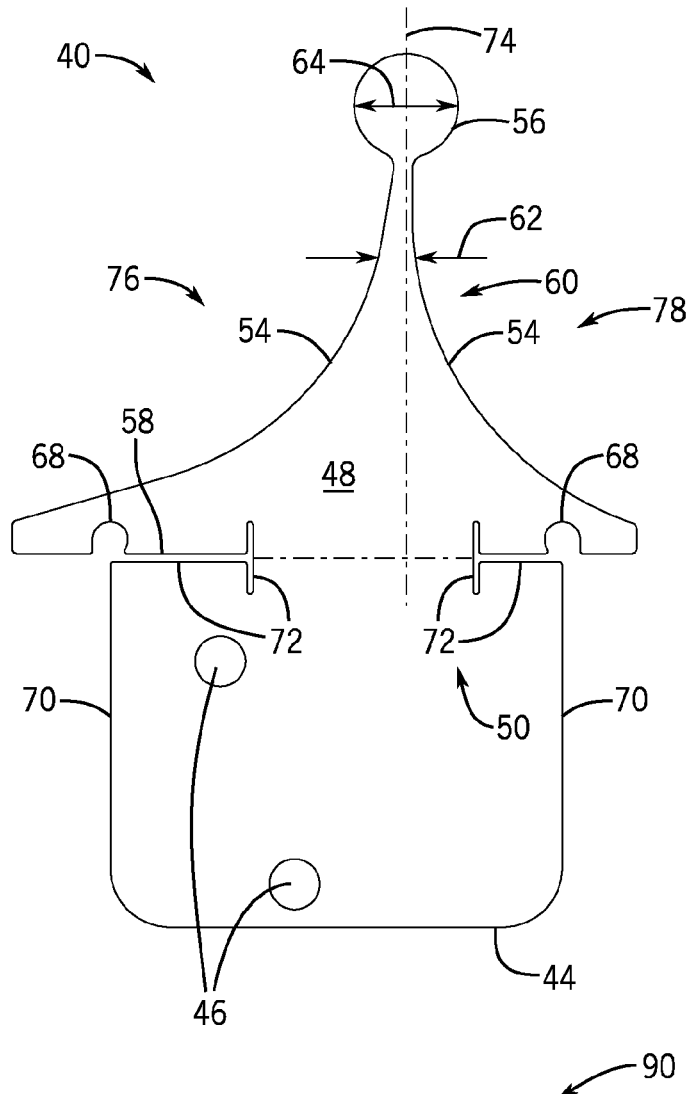
FIG. 5 is a top view of an embodiment of a partially formed gusset.

FIG. 5 is a top view of an embodiment of the gusset 40 formed from a flat plate. For example, in certain embodiments, the gusset 40 may be laser cut from a metal plate. However, in other embodiments, different manufacturing processes may be utilized. For example, the gusset 40 may be formed via water jet cutting, stamping, die casting, or the like. Additionally, the gusset 40 may be formed from composite materials, polymeric material, or the like. As shown, the gusset 40 includes the base 44, the body 48, and the transition 50 extending between the base 44 and the body 48. Moreover, the slits 72 separate a portion of the base 44 from a portion of the body 48. Also, in the illustrated embodiment, the slits 72 extend into the base 44 and the body 48 at the transition 50. That is, the slits 72 extend substantially perpendicular to a stress reducer axis 74 to separate at least a portion the base 44 from at least a portion the body 48 and substantially parallel to the stress reducer axis 74 to form the transition 50.

In the illustrated embodiment, the gusset 40 is not symmetrical about the stress reducer axis 74. In other words, a first side 76 of the gusset 40 has a larger surface area than a second side 78 of the gusset 40. In certain embodiments, the gusset 40 may be configured to be non-symmetrical to account for internal or adjacent components of the tank 34. For instance, the tank 34 may include reinforcing ribs, orifices for adding fluid to the tank, or the like. The gusset 40 may be formed to avoid interference with the internal or adjacent components of the tank 34 by adjusting the surface areas and/or shapes of the first and second sides 76, 78. However, in other embodiments, the gusset 40 may be symmetrical about the stress reducer axis 74. Moreover, in certain embodiments, the gusset 40 may be configured to align with the internal or adjacent components of the tank 34.

As will be described in detail below, the gusset 40 may be formed (e.g., cut, cast, etc.) and then subsequently shaped to form the curved portion 52 of the transition 50. For example, the gusset 40 may be bent on a brake press to form the curved portion 52 and to orient the base 44 substantially 90 degrees relative to the body 48. Additionally, after the gusset 40 is formed, the gusset 40 may be mounted on the tank 34 to enable the redistribution of stresses acting on the tank 34 due to the force 38 from the weight of the components and the force generated as the off-road vehicle 10 moves through the field. In certain embodiments, the gusset 40 is welded to the tank 34 and/or the loading plate 42. Additionally, in other embodiments, the gusset 40 may be coupled to the tank 34 and/or the loading plate 42 via fasteners. For example, the stress reducer 56 may dissipate the force 38 along the edges 54 of the body 48 and across the tank 34.

Figure 6:
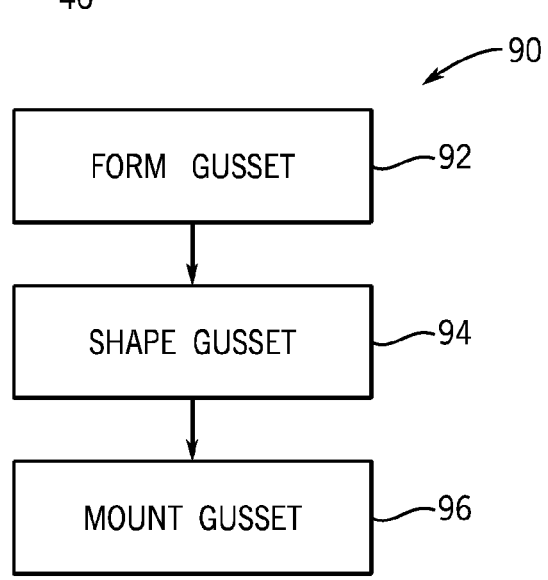
FIG. 6 is a flow chart of an embodiment of a method of manufacturing a gusset.

FIG. 6 is a flowchart of an embodiment of a method 90 for forming the gusset 40. In the illustrated embodiment, the gusset 40 is formed at block 92. For example, the gusset 40 may be laser cut from a metal plate (e.g., a flat plate). However, in other embodiments, the gusset 40 may be formed via other manufacturing processes (e.g., cutting processes, casting processes, injection molding processes, etc.). Moreover, as described above, the gusset 40 may include the base 44, the body 48, and the transition 50. Then, the gusset 40 is shaped at block 94. For example, the gusset 40 may be bent in a brake press to orient the base 44 at an approximately 90 degree angle relative to the body 48. Additionally, in other embodiments, the gusset 40 may be bent using other bending tools or machining processes. Furthermore, bending the gusset 40 may form the curved portion 52 in the transition 50. Moreover, in embodiments in which the gusset 40 is cast or molded, the shaping process may be obviated. Then, the gusset 40 is mounted to the tank 34 and the loading plate 42 at block 96. However, as mentioned above, the gusset 40 may be utilized with other components. For example, the gusset 40 may be mounted between a first mounting surface and a second mounting surface to distribute loads from the first mounting surface to the second mounting surface. In certain embodiments, the gusset 40 is welded to the tank 34 and the loading plate 42, or to the first and second mounting surfaces. The weld may extend substantially about the periphery of the base 44 and the body 48. However, the weld may not extend into the slits 72 or the notches 68. In other embodiments, the gusset 40 may be bolted or otherwise attached to the tank 34 and the loading plate 42, or to the first and second mounting surfaces. Accordingly, the gusset 40 may be manufactured and mounted on the agricultural vehicle 10. Moreover, as will be appreciated, in certain embodiments the gusset 40 may be utilized in other suitable settings where load distribution may be desirable.

As described in detail above, the gusset 40 is configured to dissipate the force 38 acting on the tank 34 toward the frame of the agricultural vehicle 10. The gusset 40 includes the base 44 and the body 48 coupled by the transition 50. In certain embodiments, the transition 50 includes the curved portion 52. The curved portion 52 directs the load from the body 48 to the base 44. Furthermore, the body 48 includes the stress reducer 56. The stress reducer 56 is coupled to the neck 60 formed by the convergence of the edges 54 and is configured to redistribute the load over a larger surface area, thereby reducing or eliminating stress concentrations on the tank 34. Accordingly, the gusset 40 is configured to direct forces away from the tank 34 and toward the frame of the agricultural vehicle 10, thereby substantially reducing or eliminating undesirable stress concentrations on the tank 34.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An exhaust support system for an off-road vehicle, comprising:
   a fender having a liquid storage tank;
   a loading plate coupled to a frame of the off-road vehicle; and
   a gusset coupled to the liquid storage tank and to the loading plate, wherein the gusset is formed from a flat plate and comprises a body coupled to the liquid storage tank, a base coupled to the loading plate, and a curved portion coupling the base to the body and configured to redistribute a force from the liquid storage tank to the loading plate.

2. The exhaust support system of claim 1, wherein the body comprises edges configured to converge at a stress reducer.

3. The exhaust support system of claim 2, wherein the body and the base are coupled to one another via only the curved portion.

4. The exhaust support system of claim 2, wherein the edges are substantially curved and configured to form a neck proximate to the stress reducer.

5. The exhaust support system of claim 4, wherein the neck has a first width and the stress reducer has a second width, the first width being smaller than the second width.

6. The exhaust support system of claim 1, wherein the gusset is coupled to the liquid storage tank and to the loading plate via a welded connection extending about at least a portion of a periphery of the gusset.

7. A system, comprising:
   a gusset formed from a flat plate, comprising:
      a body having concave edges that converge to form a neck having a first width;
      a stress reducer extending from the neck, wherein a second width of the stress reducer is greater than the first width of the neck;
      a base oriented at an angle relative to the body, wherein the base comprises apertures configured to receive fasteners to couple the base to a frame of an off-road vehicle; and
      a transition extending between the body and the base.

8. The gusset of claim 7, wherein the transition comprises a curved portion, an angled portion, or a combination thereof.

9. The gusset of claim 7, wherein the angle is approximately 90 degrees.

10. A system, comprising:
a gusset from a flat plate, comprising:
- a body having concave edges that converge to form a neck having a first width,
- a stress reducer extending from the neck, wherein a second width of the stress reducer is greater than the first width of the neck;
- a base oriented at an angle relative to the body;
- a transition extending between the body and the base; and
- a pair of slits positioned between the base and the body, wherein a first slit of the pair of slits is positioned and on a first side of the transition and a second slit of the pair of slits is positioned on a second side of the transition, and the pair of slits separate the base from the body.

11. A system, comprising:
a gusset formed from a flat plate, comprising:
- a body having concave edges that converge to form a neck having a first width;
- a stress reducer extending from the neck, wherein a second width of the stress reducer is greater than the first width of the neck;
- a base oriented at an angle relative to the body;
- a transition extending between the body and the base; and
- a plurality of notches formed along a bottom of the body proximate to the base, wherein the plurality of notches are configured to direct stress toward the transition.

12. The gusset of claim 11, wherein at least one of the plurality of notches is arcuate.

13. The gusset of claim 7, wherein the concave edges are arcuate, linear, or a combination thereof.

14. The gusset of claim 7, wherein the stress reducer is substantially circular.

15. A method of forming a support system, comprising:
forming a flat plate via a first manufacturing process, wherein the flat plate comprises a base, a body, and a transition extending between the base and the body;

shaping the flat plate via a second manufacturing process to form a gusset, wherein shaping the flat plate comprises orienting the base at an angle relative to the body and forming a curved portion at the transition, wherein the second manufacturing process comprises shaping the flat plate in a brake press; and mounting the body of the gusset to a first mounting surface, and mounting the base of the gusset to a second mounting surface.

16. The method of claim 15, wherein the first manufacturing process comprises a cutting process, a casting process, a molding process, or a combination thereof.

17. The method of claim 15, wherein the first manufacturing process comprises laser cutting the flat plate from a single sheet of material.

18. The method of claim 15, wherein mounting the body of the gusset to the first mounting surface and mounting the base of the gusset to the second mounting surface comprises welding about a periphery of the body and welding about a periphery of the base.

* * * * *